US009225898B2

(12) United States Patent
Hiasa

(10) Patent No.: US 9,225,898 B2
(45) Date of Patent: Dec. 29, 2015

(54) IMAGE PICKUP APPARATUS, IMAGE PROCESSING SYSTEM, IMAGE PICKUP SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/225,560

(22) Filed: Mar. 26, 2014

(65) Prior Publication Data
US 2014/0293076 A1 Oct. 2, 2014

(30) Foreign Application Priority Data

Mar. 26, 2013 (JP) .................................. 2013-063170

(51) Int. Cl.
*H04N 5/232* (2006.01)
*H04N 5/357* (2011.01)

(52) U.S. Cl.
CPC ....... *H04N 5/23248* (2013.01); *H04N 5/23229* (2013.01); *H04N 5/3572* (2013.01)

(58) Field of Classification Search
CPC ............ H04N 5/3572; H04N 5/23248; H04N 5/23229; H04N 5/217; G06T 5/003; G06T 5/006; G06T 5/20; G06T 2207/20012; G06T 2207/10024
USPC .................................................... 348/208.99
See application file for complete search history.

(56) References Cited

U.S. PATENT DOCUMENTS

| 7,580,071 B2 * | 8/2009 | Uchiyama ..................... 348/251 |
| 8,049,798 B2 | 11/2011 | Hayashi |
| 8,160,385 B2 * | 4/2012 | Perlmutter et al. ........... 382/275 |
| 8,542,301 B2 * | 9/2013 | Ono et al. ..................... 348/251 |
| 8,730,357 B2 * | 5/2014 | Nishio et al. .................. 348/241 |

(Continued)

FOREIGN PATENT DOCUMENTS

| EP | 1 971 135 A1 | 9/2008 |
| JP | 4872862 B2 | 12/2011 |
| WO | 2007/074649 A1 | 7/2007 |

OTHER PUBLICATIONS

Extended European Search report issued in EP14001069 dated Sep. 12, 2014.

*Primary Examiner* — Pritham Prabhakher
(74) *Attorney, Agent, or Firm* — Rossi, Kimms & McDowell LLP

(57) ABSTRACT

An image pickup apparatus (100) generates a second image based on a first image obtained via an image pickup optical system, and includes an image obtaining unit (101) configured to obtain the first image, a storage unit (106) configured to store a plurality of pieces of correction information calculated for each of groups divided based on information of a deteriorated image generated by applying each of a plurality of deterioration functions to a reference image and on the plurality of deterioration functions, and an image correcting unit (105) configured to generate the second image based on the first image by using correction information selected from among the plurality of pieces of correction information depending on information of the first image and the deterioration function based on shooting condition information.

10 Claims, 8 Drawing Sheets

(56) References Cited

U.S. PATENT DOCUMENTS

| | | | |
|---|---|---|---|
| 8,792,009 B2* | 7/2014 | Oota | 348/208.1 |
| 8,823,822 B1* | 9/2014 | Bhakta et al. | 348/222.1 |
| 2001/0008418 A1 | 7/2001 | Yamanaka et al. | |
| 2008/0174678 A1* | 7/2008 | Solomon | 348/231.99 |
| 2009/0041378 A1* | 2/2009 | Yamaoka et al. | 382/275 |
| 2012/0033107 A1 | 2/2012 | Ono et al. | |
| 2012/0044369 A1* | 2/2012 | Irisawa et al. | 348/208.4 |
| 2012/0044387 A1* | 2/2012 | Usami | 348/240.3 |
| 2012/0105649 A1 | 5/2012 | Okada | |
| 2012/0147224 A1* | 6/2012 | Takayama | 348/241 |
| 2012/0288193 A1* | 11/2012 | Hatakeyama | 382/167 |
| 2013/0057734 A1* | 3/2013 | Tachi | 348/242 |

* cited by examiner

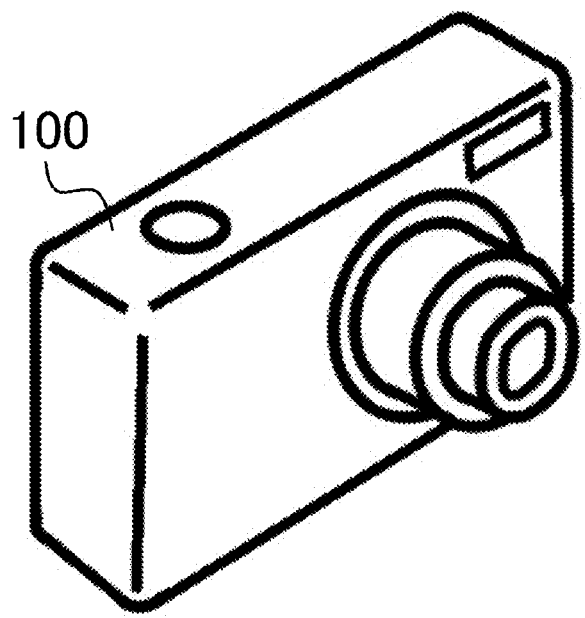
FIG. 2
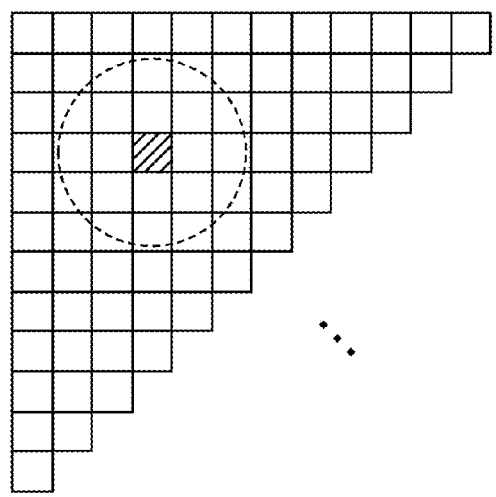 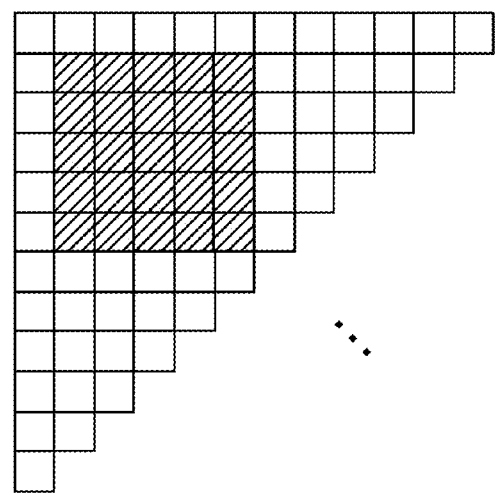
FIG. 3A    FIG. 3B

| ZOOM Z | F-NUMBER F | ... | IMAGE HEIGHT H | WAVE-LENGTH λ | CLUSTER | | CLUSTER NO. | CORRECTION COEFFICIENT |
|---|---|---|---|---|---|---|---|---|
| | | | | | FIRST LEVEL | SECOND LEVEL | | |
| $Z_1$ | $F_1$ | ... | $H_1$ | $\lambda_1$ |  PSF-1 | $000\cdots00$ | 1-1 | $w_{1-1,1}, w_{1-1,2}, \cdots$ |
| | | | | | | $000\cdots01$ | 1-2 | $w_{1-2,1}, w_{1-2,2}, \cdots$ |
| ... | ... | ... | ... | ... | ... | ... | ... | ... |
| $Z_{u1}$ | $F_{u2}$ | ... | $H_{u3}$ | $\lambda_{u4}$ |  PSF-m | $000\cdots00$ | m-1 | $w_{m-1,1}, w_{m-1,2}, \cdots$ |
| | | | | | | $011\cdots10$ | m-n | $w_{m-n,1}, w_{m-n,2}, \cdots$ |
| ... | ... | ... | ... | ... | ... | ... | ... | ... |

IMAGE PICKUP APPARATUS, IMAGE PROCESSING SYSTEM, IMAGE PICKUP SYSTEM, IMAGE PROCESSING METHOD, AND NON-TRANSITORY COMPUTER-READABLE STORAGE MEDIUM

BACKGROUND OF THE INVENTION

1. Field of the Invention

The present invention relates to an image pickup apparatus which performs image restoration processing for a shot image.

2. Description of the Related Art

Recently, a high-quality shot image is desired along with a high-definition of a display device. However, the quality of the shot image is deteriorated due to an influence of aberration or diffraction by an optical system. On the other hand, a method of improving a quality of a shot image by applying an inverse filter for the deterioration such as a Wiener filter to the shot image (an image correcting method) is proposed. However, in the image correcting method of using the inverse filter, a frequency component in which an MTF (Modulation Transfer Function) is small cannot be restored.

International Publication No. WO2007/074649 discloses a method of reducing the decrease of the MTF in a depth direction by inserting a phase modulation element into an optical system. Japanese Patent No. 4872862 discloses a method of restoring a lost frequency component by a super-resolution through study to remove a blurring caused by a hand movement (a hand shake) or defocusing from an image.

However, the method disclosed in International Publication No. WO2007/074649 is a method of reducing the decrease of the MTF in a defocused region, which cannot obtain its effect in a focus position. In other words, the purpose of International Publication No. WO2007/074649 is only to enlarge the depth of field, and therefore it cannot restore a frequency component in which the MTF is small due to the influence of the aberration or the diffraction. In addition, since it is necessary to have a special optical system configured by inserting the phase modulation element at the time of shooting an image, a shot image cannot be corrected. On the other hand, since the purpose of the method disclosed in Japanese Patent No. 4872862 is to remove the blurring caused by the hand movement (the hand shake) or the defocusing, similarly it cannot restore a frequency component in which the MTF is small due to the influence of the aberration or the diffraction.

BRIEF SUMMARY OF THE INVENTION

The present invention provides an image pickup apparatus, an image processing system, an image pickup system, an image processing method, and a non-transitory computer-readable storage medium which are capable of restoring a frequency component lost due to aberration or diffraction in a shot image.

An image pickup apparatus as one aspect of the present invention generates a second image based on a first image obtained via an image pickup optical system, and includes an image obtaining unit configured to obtain the first image, a storage unit configured to store a plurality of pieces of correction information calculated for each of groups divided based on information of a deteriorated image generated by applying each of a plurality of deterioration functions to a reference image and on the plurality of deterioration functions, and an image correcting unit configured to generate the second image based on the first image by using correction information selected from among the plurality of pieces of correction information depending on information of the first image and the deterioration function based on shooting condition information.

An image processing system as another aspect of the present invention generates a second image based on a first image obtained via an image pickup apparatus, and includes a communication unit configured to receive the first image, a storage unit configured to store a plurality of pieces of correction information calculated for each of groups divided based on information of a deteriorated image generated by applying each of a plurality of deterioration functions to a reference image and on the plurality of deterioration functions, and an image correcting unit configured to generate the second image based on the first image by using correction information selected from among the plurality of pieces of correction information depending on information of the first image and the a deterioration function based on shooting condition information.

An image pickup system as another aspect of the present invention generates a second image based on a first image obtained via an image pickup apparatus, and includes a communication unit configured to receive the first image, a storage unit configured to store a plurality of pieces of correction information calculated for each of groups divided based on information of a deteriorated image generated by applying each of a plurality of deterioration functions to a reference image and on the plurality of deterioration functions, and an image correcting unit configured to generate the second image based on the first image by using correction information selected from among the plurality of pieces of correction information depending on information of the first image and the a deterioration function based on shooting condition information.

An image processing method as another aspect of the present invention generates a second image based on a first image obtained via an image pickup optical system, includes the steps of obtaining the first image, and generating the second image based on the first image by using correction information selected from among a plurality of pieces of correction information depending on information of the first image and a deterioration function based on shooting condition information, and the plurality of pieces of correction information are previously calculated for each of groups divided based on information of a deteriorated image generated by applying each of a plurality of deterioration functions to a reference image and on the plurality of deterioration functions.

A non-transitory computer-readable storage medium as another aspect of the present invention stores an image processing program which causes a computer to execute a process including the steps of obtaining the first image obtained via an image pickup optical system, and generating a second image based on the first image by using correction information selected from among a plurality of pieces of correction information depending on information of the first image and a deterioration function based on shooting condition information, and the plurality of pieces of correction information are previously calculated for each of groups divided based on information of a deteriorated image generated by applying each of a plurality of deterioration functions to a reference image and on the plurality of deterioration functions.

Further features and aspects of the present invention will become apparent from the following description of exemplary embodiments with reference to the attached drawings.

BRIEF DESCRIPTION OF THE DRAWINGS

FIG. 2 is an external view of the image pickup apparatus in Embodiment 1.

FIGS. 3A and 3B are diagrams of describing an effect of a deterioration function in each of Embodiments 1 to 3.

DESCRIPTION OF THE EMBODIMENTS

Figure 1:
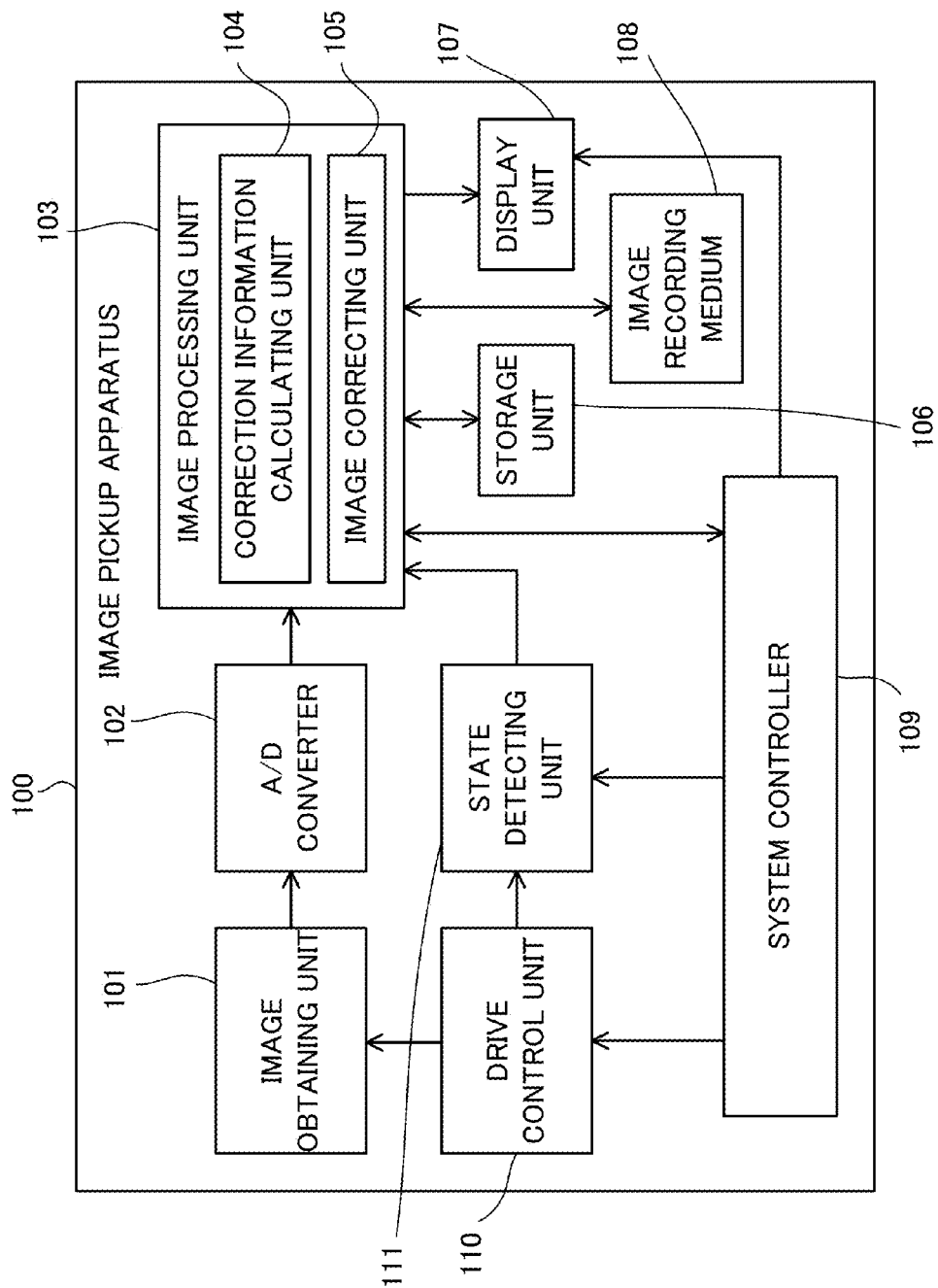
FIG. 1 is a block diagram of an image pickup apparatus in Embodiment 1.

Exemplary embodiments of the present invention will be described below with reference to the accompanied drawings. In the drawings, the same elements will be denoted by the same reference numerals and the descriptions thereof will be omitted.

(Embodiment 1)

First of all, referring to FIGS. 1 and 2, an image pickup apparatus in Embodiment 1 of the present invention will be described. FIG. 1 is a block diagram of an image pickup apparatus 100 in the present embodiment. FIG. 2 is an external view of the image pickup apparatus 100. The image pickup apparatus 100 is configured to generate a second image (a restored image) based on a first image (a shot image) obtained via an image pickup optical system.

The image pickup apparatus 100 of the present embodiment is capable of performing an image processing method which includes a step (a first step) of obtaining correction information to be used to restore (recover) a frequency component lost due to aberration or diffraction, and a step (a second step) of performing image restoration processing by using the correction information. In the present embodiment, the first step is performed by a correction information calculating unit 104 of an image processing unit 103 (an image processor) before shooting an image (before obtaining a shot image). The second step is performed by an image correcting unit 105 of the image processing unit 103 for the shot image (the first image).

The correction information calculating unit 104 calculates the correction information before shooting an image, based on a reference image stored in a storage unit 106 and on a deterioration function depending on optical characteristics of an image obtaining unit 101. The reference image is an image that is not influenced by the aberration or the diffraction so much and that contains various types of frequency components. The details of a method of calculating the correction information performed by the correction information calculating unit 104 will be described below.

The correction information calculated by the correction information calculating unit 104 is stored in the storage unit 106. An image recording medium 108 which is configured by a semiconductor memory or the like may be used when reading the reference image or the deterioration function or storing the correction information. The processing equivalent to the processing performed by the correction information calculating unit 104 may also be performed by an apparatus (an external apparatus) separated from the image pickup apparatus 100 to store the correction information calculated by the apparatus in the storage unit 106 or the image recording medium 108. The calculation of the correction information by the correction information calculating unit 104 only needs to be performed once. The present embodiment is not limited to this, but the calculation of the correction information can also be performed regularly while changing the reference image or the deterioration function.

In the present embodiment, the image obtaining unit 101 includes an imaging optical system (an image pickup optical system) and an image pickup element. The image pickup element includes a CCD (Charge Coupled Device) sensor, a CMOS (Complementary Metal-Oxide Semiconductor) sensor, or the like. In this configuration, the image obtaining unit 101 obtains the first image (the shot image) via the image pickup optical system. The image obtaining unit 101 may also include a micro lens arranged on a pixel of the image pickup element, in addition to the imaging optical system. The deterioration function is, for example, a PSF (Point Spread Function) or an OTF (Optical Transfer Function).

When shooting an image, light entering the image obtaining unit 101 is collected by the imaging optical system, and then is converted into an analog electric signal by the image pickup element. An A/D converter 102 converts the analog electric signal generated by the photoelectric conversion performed by the image pickup element into a digital signal, and outputs this digital signal to the image processing unit 103. The image processing unit 103 performs predetermined image processing for the digital signal (an image signal) inputted from the A/D converter 102.

The image correcting unit 105 of the image processing unit 103 performs a restoration (the image restoration processing) for the frequency component by using the correction information. The image correcting unit 105 uses shooting condition information of the image obtaining unit 101 obtained by a state detecting unit 111 when performing the image restoration processing. The shooting condition information relates to a state of the image pickup apparatus 100 when shooting an image, which is for example a state of an aperture stop, a focus position, or a focal length in a zoom lens. The state detecting unit 111 is configured to obtain the shooting condition information from a system controller 109 or a drive control unit 110.

The image processed (corrected) by the image processing unit 103 (the image correcting unit 105) is stored in the image recording medium 108 in a predetermined format. At the same time, the shooting condition information may also be stored in the image recording medium 108. When the image stored in the image recording medium 108 is to be viewed, this image is outputted to a display unit 107 such as a liquid crystal display.

A series of controls described above is performed by the system controller 109. A mechanical drive of the image obtaining unit 101 is performed by the drive control unit 110 based on an instruction of the system controller 109.

Subsequently, the image processing method which is performed by the correction information calculating unit 104 and the image correcting unit 105 of the image processing unit 103 will be described in detail. First, outlines of the method of calculating the correction information and the restoration (recovery) of the frequency component by using the calculation method will be described, and then, a specific image processing method will be described.

First of all, pixel signal values of a reference image are to be expressed by a linear combination of pixel signal values of a deteriorated image. The deteriorated image is an image (deteriorated image) which is obtained by deteriorating the reference image due to the application of a deterioration function. In the present embodiment, pixels of the deteriorated image to be used for the linear combination are determined based on the deterioration function.

FIGS. 3A and 3B are diagrams of describing an effect of the deterioration function in the present embodiment. In the present embodiment, for example, a target pixel (a shaded area) of the reference image illustrated in FIG. 3A will be considered. When a deterioration function (a PSF in the embodiment) which has a circular spread indicated by a dashed line in FIG. 3A is applied to the target pixel, a signal value of the target pixel spreads into the shaded area in FIG. 3B. In other words, the shaded area in FIG. 3B contains information related to the target pixel illustrated in FIG. 3A.

Therefore, in the present embodiment, the signal value of the target pixel is expressed by the linear combination of the pixel signal values included in the shaded area of FIG. 3B. The shaded area in FIG. 3B is referred to as a partial region of the deteriorated image. However, each of a size and a shape of the partial region in the deteriorated image is not limited to this. For example, when intensity is extremely small in the vicinity of the PSF, the vicinity of the PSF may be removed from the partial region of the deteriorated image.

A signal value y of the target pixel of the reference image is represented as the following Expression (1) by using the pixel signal values in the partial region of the deteriorated image.

$$y = \sum_j w_j x_j \quad (1)$$

In Expression (1), symbol $x_j$ is a signal value of each pixel included in the partial region of the deteriorated image, and symbol $w_j$ is a coefficient for each pixel.

Next, the target pixel is changed in the same reference image, and similarly a partial region of the deteriorated image is extracted. A relational expression represented by Expression (1) is individually applied to each of the target pixels. In this case, the coefficient $w_j$ has a different value depending on each relational expression. However, partial regions of the deteriorated image having a similarity to each other have values in which the coefficients $w_j$ are close to each other. Therefore, the partial regions of the deteriorated image which have high similarities to each other are collected to generate a cluster (a group of data). A method of determining the similarity will be described below. As a result, a plurality of clusters in which data having high similarities are collected are generated. Since the coefficients $w_j$ are close to each other in the same cluster, simultaneous equations are represented as the following Expression (2) by using a common value as the coefficients.

$$\begin{pmatrix} y_1 \\ y_2 \\ \vdots \\ y_{imax} \end{pmatrix} = \begin{pmatrix} x_{11} & x_{12} & \cdots & x_{1jmax} \\ x_{21} & \ddots & & \vdots \\ \vdots & & & \vdots \\ x_{imax,1} & \cdots & \cdots & x_{imax,jmax} \end{pmatrix} \begin{pmatrix} w_1 \\ w_2 \\ \vdots \\ w_{jmax} \end{pmatrix} + \begin{pmatrix} e_1 \\ e_2 \\ \vdots \\ e_{imax} \end{pmatrix} \quad (2)$$

In Expression (2), symbol imax is the number of data included in a certain cluster, symbol jmax is the number of pixels in a partial region, and symbol $e_i$ is an error generated in i-th data due to using a common value as the coefficients.

Expression (2) can also be represented as the following Expression (3).

$$Y = XW + E \quad (3)$$

In Expression (3), symbol Y is a column vector which represents a signal value in a target pixel of a reference image, symbol X is a matrix which represents each signal value in a partial region of a deteriorated image, symbol W is a column vector which represents a coefficient, and symbol E is a column vector which represents an error.

In each cluster, the coefficient W is determined so that the error E of Expression (3) is minimized to be able to obtain correction information for each cluster. As an example of a method of determining the coefficient W, a determining method by a method of least squares is used in the present embodiment, but the determining method of the coefficient W is not limited to this. In the method of least squares, the coefficient W is selected so that the expression of $e_1^2 + e_2^2 + \ldots + e_{imax}^2$ is minimized. Therefore, the following Expression (4) is satisfied.

$$\sum_i e_i \frac{\partial e_i}{\partial w_j} = 0 \quad (4)$$

In addition, based on Expression (3), the following Expression (5) is satisfied.

$$\frac{\partial e_i}{\partial w_j} = x_{ij} \quad (5)$$

Accordingly, based on Expressions (4) and (5), the following Expression (6) is derived.

$$\sum_i e_i x_{ij} = 0 \quad (6)$$

Subsequently, Expression (3) is rewritten as the following Expression (7).

$$x_{ik}(y_i + e_i) = x_{ik} \sum_j w_j x_{ij} \quad (7)$$

In Expression (7), symbol k is a value within a range from 1 to jmax. Expression (7) is deformed as the following Expression (8) by using Expression (6).

$$\sum_{i} x_{ik} y_i = \sum_{i,j} x_{ij} x_{ik} w_j \qquad (8)$$

Expression (8) is a normal equation which is simultaneous linear equations with jmax unknowns. A most probable value of the coefficient W can be obtained by solving Expression (8). Then, this value is stored as correction information for the cluster.

Expression (8) can also be rewritten as the following Expression (9).

$$\begin{pmatrix} \sum_i x_{i1} y_i \\ \sum_i x_{i2} y_i \\ \vdots \\ \sum_i x_{i,jmax} y_i \end{pmatrix} = \qquad (9)$$

$$\begin{pmatrix} \sum_i x_{i1} x_{i1} & \sum_i x_{i2} x_{i1} & \cdots & \sum_i x_{i,jmax} x_{i1} \\ \sum_i x_{i1} x_{i2} & \ddots & & \vdots \\ \vdots & & & \vdots \\ \sum_i x_{i1} x_{i,jmax} & \cdots & \cdots & \sum_i x_{i,jmax} x_{i,jmax} \end{pmatrix} \begin{pmatrix} w_1 \\ w_2 \\ \vdots \\ w_{jmax} \end{pmatrix} \equiv MW$$

Expression (9) requires careful handling since the coefficient W cannot be correctly calculated when a rank of a matrix M is less than jmax. In order to ensure the rank of the matrix M, a certain number of data needs to be stored in each cluster.

The present embodiment describes the case where the coefficient W is calculated with respect to one deterioration function, but actually the coefficient W may be calculated for each of various shooting conditions. This is because the deterioration function varies depending on a state of a zoom or an aperture stop of the image pickup apparatus 100, an angle of view, a wavelength, or the like. The cluster is generated for each deterioration function to perform a similar calculation, and thus the correction information can be obtained.

Next, a method of restoring (recovering) a frequency component lost due to aberration or diffraction by using the correction information will be described. In the present embodiment, an image (a shot image) obtained by the image obtaining unit 101 is referred to as a first image. The first image is an image which is deteriorated by the aberration or the diffraction of the image obtaining unit 101.

Describing with reference to FIGS. 3A and 3B, the first image is in a state where information originally obtained in the shaded pixel (the target pixel) of FIG. 3A spreads into the shaded area (the partial region of the deteriorated image) of FIG. 3B due to the aberration or the diffraction. In this case, the circle indicated by the dashed line in FIG. 3A corresponds to the aberration or the diffraction of the image obtaining unit 101. Therefore, the first image (the shot image) needs to be restored (recovered) so as to be in the state of FIG. 3A.

Similarly to the case described above, a partial region in the first image (the shot image) is extracted. Then, searching a cluster to which the extracted partial region is to belong from among a plurality of clusters generated when the correction information is calculated, the correction information and the signal value of the partial region are substituted into Expression (1). As a result, a pixel in which the aberration or the diffraction is corrected can be generated. A method of searching the cluster will be described below. As a result, information of a frequency band in which an MTF (Modulation Transfer Function) is extremely small can also be restored. This is because the coefficient W (the correction information) containing the lost information of the frequency band can be calculated based on the reference image.

Figure 4:
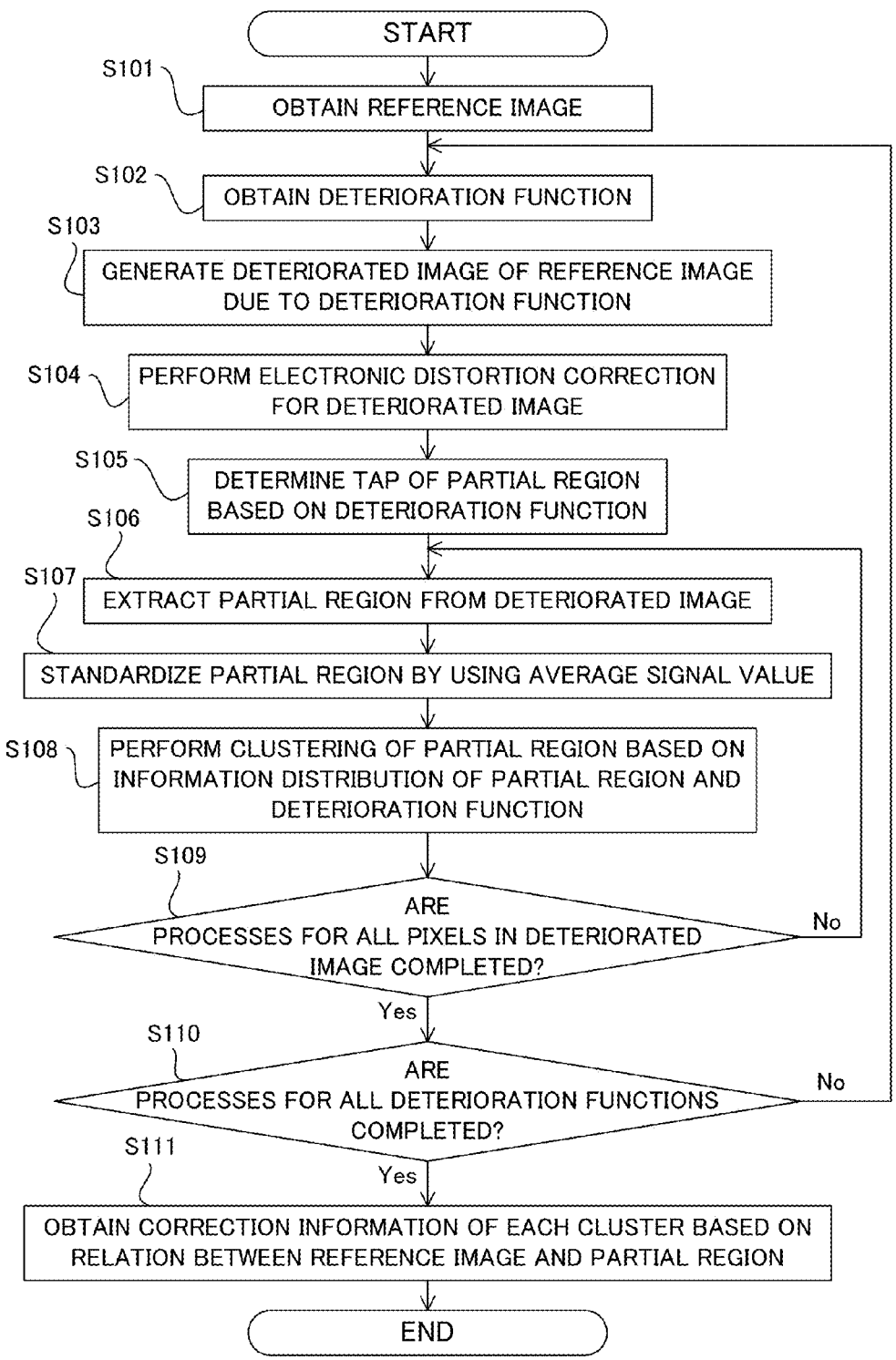
FIG. 4 is a flowchart of an image processing method (a method of calculating correction information) in each of Embodiments 1 to 3.

Next, referring to FIG. 4, the image processing method (the method of calculating the correction information) that is performed by the image processing unit 103 (the correction information calculating unit 104) in the present embodiment will be described in detail. FIG. 4 is a flowchart of the image processing method (the method of calculating the correction information) in the present embodiment.

First, in Step S101, the image processing unit 103 (the correction information calculating unit 104) obtains a reference image. The reference image may use any one of a shot image (a photographed image) and a CG (Computer Graphics). It is preferred that the reference image contain various types of contrasts or frequency components. This is because the correction information is calculated based on the reference image. In other words, an effect of the image correcting unit 105 (a correction effect) is determined depending on information contained in the reference image. For example, when the reference image does not contain a frequency component, the frequency component cannot be restored by the correction.

Subsequently, in Step S102, the correction information calculating unit 104 obtains a deterioration function to be applied to the reference image. In the present embodiment, as the deterioration function, a deterioration function depending on an optical system (the image pickup optical system) of the image obtaining unit 101 is used. Therefore, a plurality of deterioration functions are previously prepared depending on shooting condition information such as a state of a zoom (a zoom lens) or an aperture stop of the optical system, an image height, or a wavelength. The present embodiment is not limited to this, but a plurality of deterioration functions based on a factor other than the shooting condition information may be previously prepared. In the present embodiment, the plurality of deterioration functions to be applied to the reference image is a point spread function (PSF) or an optical transfer function (OTF). However, a function other than the PSF or the OTF may also be used as the plurality of deterioration functions.

Figure 5:
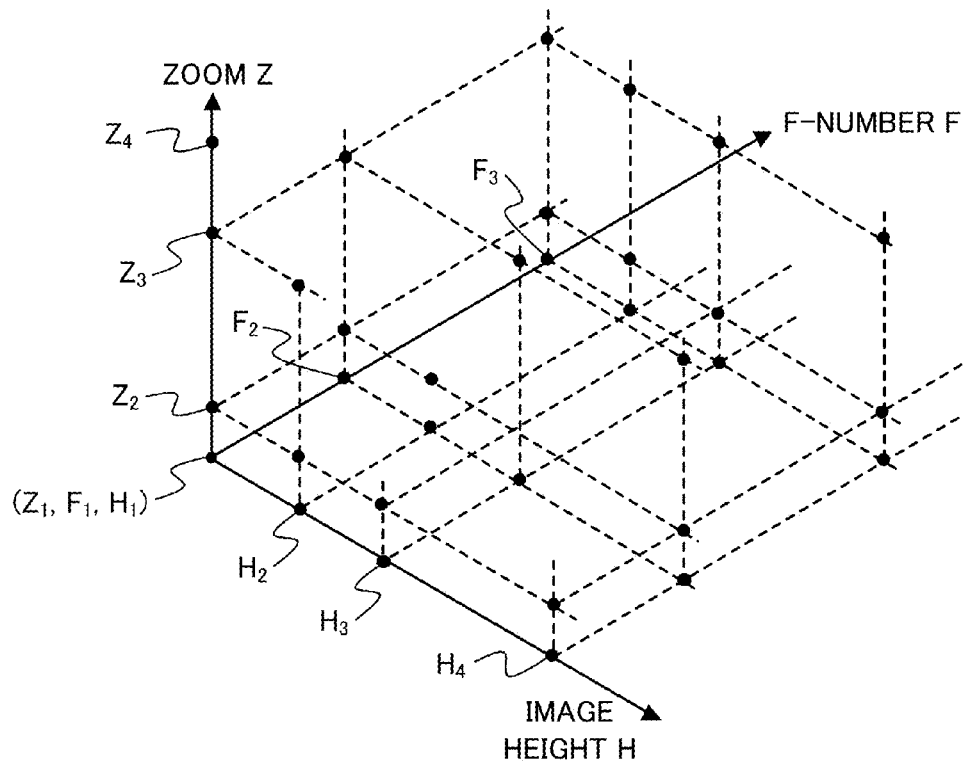
FIG. 5 is a diagram of describing a variable space of the deterioration function in each of Embodiments 1 to 3.

FIG. 5 is a diagram of describing the variable space of the deterioration function in the present embodiment. Three axes in FIG. 5 indicate a state of the zoom (Zoom Z) in the optical system, a state of the aperture stop (F-number F) and an image height H, respectively. As illustrated in FIG. 5, the correction information calculating unit 104 of the present embodiment has deterioration functions for a plurality of discrete points in a three-dimensional space. The deterioration functions may be stored with a configuration different from the configuration illustrated in FIG. 5. The deterioration functions may also be stored for a dimensional space lower than or higher than the three-dimensional space.

In the present embodiment, it is preferred that a wavelength which determines the deterioration function is determined depending on a color component of the first image (the shot image). Since an image is represented based on three colors of RGB (Red, Green, and Blue) in the present embodiment, a deterioration function for the wavelength which corresponds to each color component is prepared. When there is no problem even if a chromatic aberration of the optical system is ignored, it is not necessary to store the deterioration functions depending on the plurality of wavelengths.

The deterioration function obtained in Step S102 of FIG. 4 may be obtained independently of the optical system of the image obtaining unit 101. In this case, the correction information for the plurality of deterioration functions are calculated and a deterioration function which is similar to the deterioration function of the optical system (the image pickup optical system) of the image obtaining unit 101 is searched in the image correction to use the calculation result. As a method of searching the deterioration function which is similar to the deterioration function of the image pickup optical system, there is a method of using an evaluation function such as PSNR (Peak Signal-to-Noise Ratio) or SSIM (Structural Similarity) by using the deterioration function to resemble an image.

Subsequently, in Step S103, the correction information calculating unit 104 deteriorates the reference image by using the deterioration function to generate a deteriorated image. For example, when the deterioration function is the PSF, the correction information calculating unit 104 performs a convolution for the reference image to generate the deteriorated image. On the other hand, when the deterioration function is the OTF, the correction information calculating unit 104 may calculate the product of the Fourier transform of the reference image and then perform the inverse transform to generate the deteriorated image.

Subsequently, in Step S104, the correction information calculating unit 104 performs a distortion correction (an electronic distortion correction) for the deteriorated image generated in Step S103. As described above, the correction information is calculated by comparing the reference image with the deteriorated image. In other words, comparing two images which are different in presence or absence of the aberration or the diffraction for an identical object or the like, the correction information is calculated. However, when an amount of the distortion of the deteriorated image is large, positions corresponding to an object space between the two images are shifted from each other, and thus there is a possibility that the correction information cannot be precisely calculated.

Figure 6:
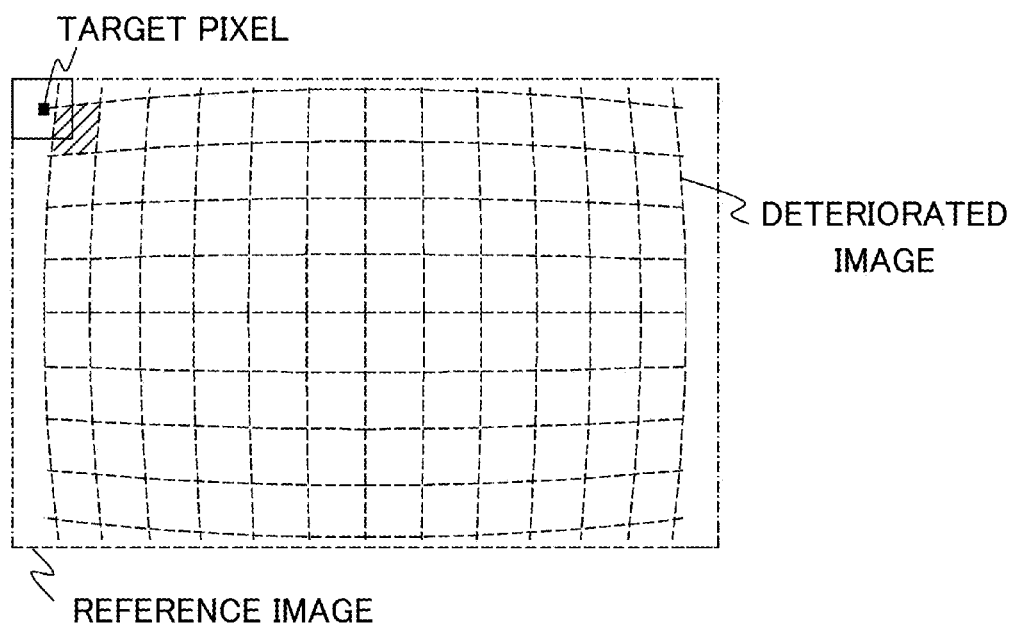
FIG. 6 is a diagram of describing an influence of distortion in each of Embodiments 1 to 3.

FIG. 6 is a diagram of describing an influence of the distortion. A dashed-dotted line in FIG. 6 indicates a reference image, and a dashed line in FIG. 6 indicates a deteriorated image in which negative distortion is contained. A black square in FIG. 6 is a target pixel of the reference image. A solid square around the target pixel as a center is a partial region of the reference image. In this case, information of an object space which exists in the sold square in the reference image is changed to exist in a region (the partial region) indicated by a shaded area in the deteriorated image due to the influence of the distortion. This corresponding position relation changes in each region of an image since the distortion changes depending on an image height. Accordingly, it is preferred that an electronic distortion correction is performed in order not to change the corresponding position relation between the target pixel and the partial region by using an easy calculation.

Instead of this, a distortion component may be previously subtracted from the deterioration function. Alternatively, considering the influence of the distortion, the partial region of the deterioration image can be deformed as the shaded area to be extracted. In this case, however, the calculation is complicated since the corresponding position relation between the target pixel and the partial region needs to be changed depending on the image height. When a method of subtracting the distortion component from the deterioration function or a method of deforming the partial region is used, Step S104 of FIG. 4 is not necessary. In addition, when the distortion component of the deterioration function is small, Step S104 does not have to be performed.

Subsequently, in Step S105 of FIG. 4, the correction information calculating unit 104 determines a tap of a partial region based on the deterioration function. It is assumed that the information of the shaded pixel (the target pixel) illustrated in FIG. 3A spreads into the shaded area (the partial region of the deteriorated image) in FIG. 3B due to the deterioration function. In this case, the information of the shaded pixel in FIG. 3A are dispersed in the shaded area of FIG. 3B. Therefore, in the present embodiment, it is preferred that the tap of the partial region is determined so that the shaded area of FIG. 3B is included.

The tap of the partial region may be determined depending on the spread of the deterioration function. For example, a certain threshold value T is set to determine the tap of the partial region depending on whether a value of integral of the deterioration function is more than or equal to the threshold value T, whether the intensity is more than or equal to the threshold value T, or the like. In the present embodiment, Step S105 may be performed at any timing if it is after Step S102 and also before Step S106. Alternatively, the predetermined tap number may be always used instead of using the spread of the deterioration function. In this case, Step S105 is not necessary.

Subsequently, in Step S106, the correction information calculating unit 104 extracts the partial region from the deteriorated image. In the present embodiment, the information of the deteriorated image is information related to each of a plurality of partial regions in the deteriorated image. Then, in Step S107, the correction information calculating unit 104 standardizes (normalizes) a signal in the partial region. The standardization (normalization) of the signal is performed by dividing each signal value by an average signal value in the partial region. In this case, a weighted average may also be used. Step S107 is performed since there is no correlation between a structure of the object space and an exposure of the image pickup apparatus 100. The brightness of the first image is dominantly affected by the exposure at the time of shooting an image. However, the frequency component contained in the object space is constant independent of the exposure at the time of shooting the image. Since an object to be restored is information related to a frequency, there is no problem even when the brightness component in the partial region is removed. Thus, the number of clusters can also be reduced. However, if an evaluation function to be used in the clustering of Step S108 has an effect to remove the brightness, Step S107 is not necessary.

Subsequently, in Step S108, the correction information calculating unit 104 generates a cluster (performs the clustering) based on information distribution of the partial region and the deterioration function. In other words, the correction information calculating unit 104 performs the clustering (grouping), i.e. divides into a plurality of groups, based on information of the deteriorated image and a plurality of deterioration functions. As a method of clustering (a method of grouping), for example the following method is performed.

Figure 7:
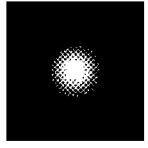
FIG. 7 is a diagram of describing a clustering (a table of correction information) in each of Embodiments 1 to 3.
Figure 7:
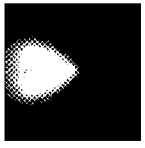

First, a first level (a first hierarchy) is generated based on the deterioration function, and further a second level (a second hierarchy) is generated depending on an information distribution of the partial region in the first level. FIG. 7 is a diagram of describing the clustering (a table of the correction information). The first level is generated by the PSF in which a state of a zoom (a zoom lens) or an aperture stop of the optical system, an image height, a wavelength, or the like is given as a discrete variable. In this case, a focus position, an object distance, or the like may also be used as a variable. The first level may also be generated by the OTF or the like. The second level defines an identical cluster where each signal value in the partial region is binarized to be arrayed by the number of pixels and an identical value is included. Instead of binarization of the signal value, re-quantization by a certain bit number may be performed.

In the present embodiment, the clustering can also be performed by using other methods. For example, at the second level, an evaluation function related to a correlation of images, such as SSIM, may be used. When an evaluated value of two partial regions satisfies a predetermined condition, the regions are to be included in the same cluster. The SSIM is an evaluation method of determining the similarity of each of brightness, a contrast, and a structure of an image. In this case, an effect equivalent to the effect of the standardization in Step S107 can also be obtained by removing the brightness component. Alternatively, the clustering may be performed by using a K-means clustering. The present embodiment does not limit the number of levels (hierarchies) of the cluster or the type of the structure of the cluster (whether or not the structure of the cluster is a hierarchical type).

Subsequently, in Step S109, the correction information calculating unit 104 determines whether the processes described above (processes in Steps S106 to S108) are completed for all pixels of the deteriorated image. When the processes described above are completed for all the pixels of the deteriorated image, the flow proceeds to Step S110. On the other hand, when the processes described above are not completed yet, the correction information calculating unit 104 changes a partial region to be extracted, and then the flow returns to Step S106 and Steps S106 to S108 are performed. When the number of data sufficient to calculate the coefficient W exits in the cluster, the flow may proceeds to Step S110 even if there is an unprocessed pixel.

Then, in Step S110, the correction information calculating unit 104 determines whether the processes described above are completed for all deterioration functions previously prepared. When the processes described above are completed for all the deterioration functions previously prepared, the flow proceeds to Step S111. On the other hand, when the processes described above are not completed yet, the correction information calculating unit 104 changes the deterioration function, and then the flow returns to Step S102 and Steps S102 to S109 are performed. When information which is necessary for the subsequent image correction processing has been obtained, the flow may proceed to Step S111 even if the processes described above are not completed for all the deterioration functions.

Subsequently, in Step S111, the correction information calculating unit 104 relates the reference image to the deteriorated image to calculate (obtain) a plurality of correction coefficients (correction information) for each of a plurality of clusters (a plurality of groups). In the present embodiment, the correction information calculating unit 104 calculates the coefficient W (the correction information) by using Expression (9). The correction information may also be calculated by using a method other than the method described above. For example, the correction information can be calculated by using linear programming. When the cluster has a hierarchical structure, Step S111 may be appropriately performed in the middle of the correction information calculating processing. For example, at the first level (the first hierarchy) in FIG. 7, the coefficient of each cluster for PSF-1 can be calculated even in the middle of obtaining data for PSF-m while the data for PSF-1 have been obtained. A plurality of pieces of calculated correction information are stored for example in the storage unit 106 to be used in the image processing method described below.

Figure 8:
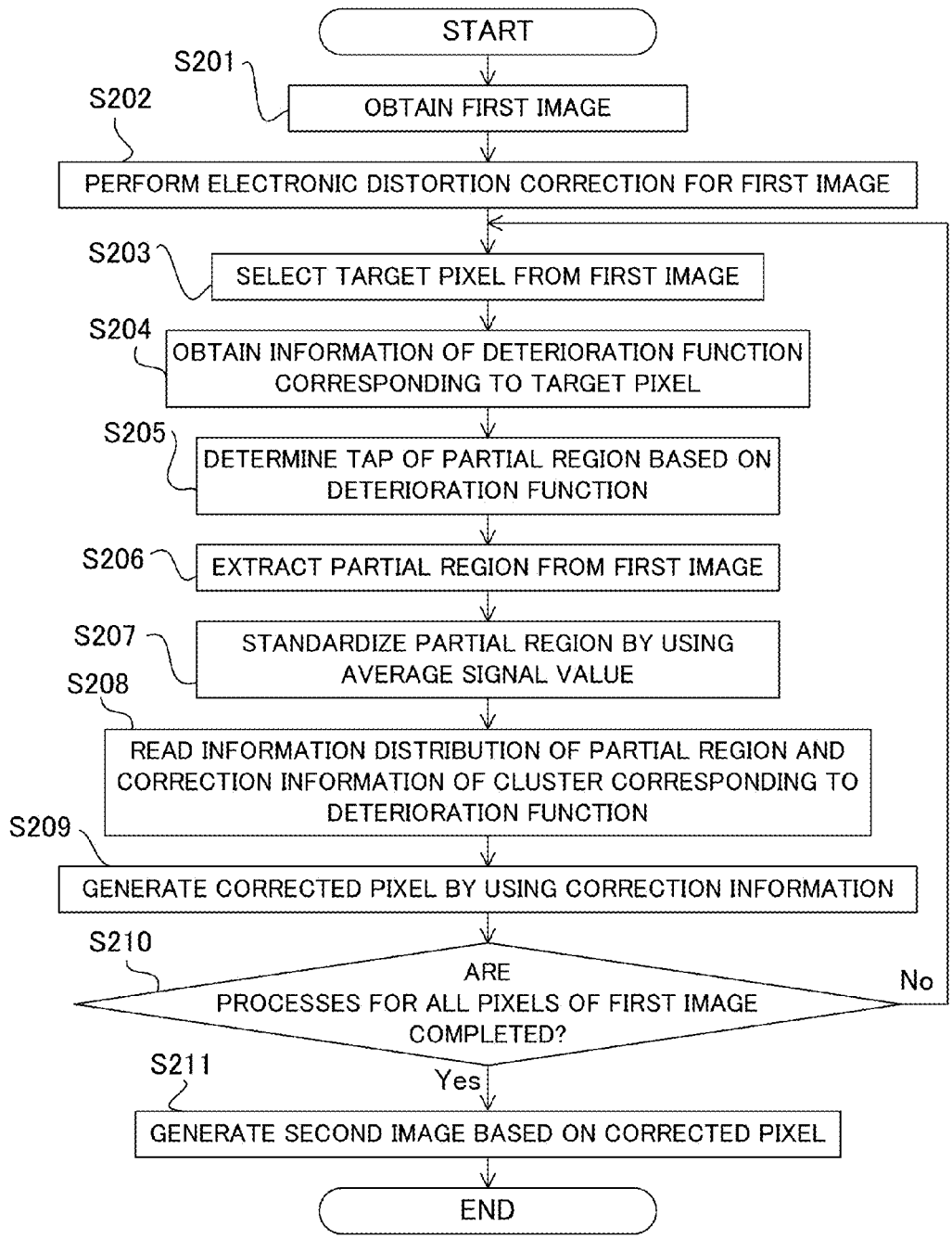
FIG. 8 is a flowchart of an image processing method (a method of correcting an image) in each of Embodiments 1 to 3.

Next, referring to FIG. 8, the image processing method (the image correcting method) which is performed by the image processing unit 103 (the image correcting unit 105) in the present embodiment will be described in detail. FIG. 8 is a flowchart of the image processing method (the image correcting method) in the present embodiment.

First, in Step S201, the image correcting unit 105 obtains a first image (a shot image) obtained by the image obtaining unit 101. Since the first image is influenced due to the aberration or the diffraction by the optical system (the image pickup optical system) of the image obtaining unit 101, frequency information with respect to an object space is reduced.

Subsequently, in Step S202, the image correcting unit 105 performs a distortion correction (an electronic distortion correction) for the first image. The reason and the detail of performing the distortion correction are the same as those of Step S104. In the present embodiment, a deterioration function based on shooting condition information contains a distortion component. Therefore, the image correcting unit 105 performs the electronic distortion correction for the first image, and then selects correction information as described below.

Subsequently, in Step S203, the image correcting unit 105 selects a target pixel from among the first image. Then, in Step S204, the image correcting unit 105 obtains a deterioration function (information of the deterioration function) corresponding to the target pixel. In this time, the deterioration function that is to be obtained is determined by using shooting condition information of the first image. When the deterioration functions are discretely prepared as illustrated in FIG. 5, it is preferred that for example a coordinate of the target pixel is plotted in a space of FIG. 5 to obtain a deterioration function for the closest point. The embodiment is not limited to the configuration in which the deterioration function itself is obtained, but may also be configured so that the spread of the function and a number of the first level (the first hierarchy) of the cluster (the group) are only be obtained. In the present embodiment, the deterioration function (the deterioration function based on the shooting condition information) is determined based on at least one of a type of the image pickup optical system, a state of the image pickup optical system while shooting an image, a color component of the image, and a position (an image height) in the first image.

Subsequently, in Step S205, the image correcting unit 105 determines a tap of the partial region based on the information of the deterioration function obtained in Step S204. In other words, a plurality of partial regions in the first image are determined based on sizes and shapes of the plurality of deterioration functions. Instead of this, a predetermined tap may also be used. In this case, Step S205 is not necessary. Alternatively, in Step S203, the partial region may be directly selected instead of selecting the target pixel.

Subsequently, in Step S206, the image correcting unit 105 extracts the partial region from among the first image (the shot image). Then, in Step S207, the image correcting unit 105 standardizes a signal in the partial region. The standardization of the signal is the same as that in Step S107.

Subsequently, in Step S208, the image correcting unit 105 reads the correction information of the cluster (the group), i.e. the correction coefficient of each cluster, corresponding to an information distribution of the partial region and the deterioration function.

In the present embodiment, the plurality of pieces of correction information are, as illustrated in FIG. 4, calculated for each of the clusters (each of the groups) divided based on the information of the deteriorated image generated by applying each of the plurality of deterioration functions to the reference image, and the plurality of deterioration functions. The plurality of pieces of calculated correction information are stored in the storage unit 106. In the present embodiment, as illustrated in FIG. 4, the plurality of pieces of correction information are previously calculated and then are stored in the storage unit 106. However, the present embodiment is not limited to this. For example, the plurality of pieces of correction information can also be calculated (updated) as needed while a user uses the image pickup apparatus 100.

When the deterioration function used by the correction information calculating unit 104 and the deterioration function obtained in Step S204 are different from each other, a corresponding cluster can be found by searching a deterioration function having a high similarity. As a method of searching the deterioration function, there is a method of using the SSIM described above by using the two deterioration functions to resemble an image.

Subsequently, in Step S209, the image correcting unit 105 generates a corrected pixel by using the partial region and the correction information. In the present embodiment, the image correcting unit 105 generates the corrected pixel (a signal value of the corrected pixel) by using Expression (1).

Subsequently, in Step S210, the image correcting unit 105 determines whether the processes for all pixels of the first image (the shot image) are completed. When the processes for all the pixels are completed, the flow proceeds to Step S211. On the other hand, when the processes for all the pixels are not completed yet, the flow returns to Step S203, and Steps S203 to S210 are performed. In the present embodiment, an object region for the image correction does not need to be an entirety of the first image, but instead, it may also be a partial region of the first image. For example, the image correction may be performed only for a region such as a peripheral region of the image where information related to a high frequency is especially lost. In this case, when processes for a designated region (a predetermined partial region) are completed, the flow proceeds to Step S211.

Then, in Step S211, the image correcting unit 105 combines (integrates) the corrected pixels to generate the second image. The second image is an image (the restored image) in which the frequency component lost due to the aberration or the diffraction of the optical system (the image pickup optical system) of the image obtaining unit 101 has been restored. In this time, if needed, image processing such as unsharp masking may be performed as well.

In the present embodiment, distance information of the object space (a distance from a focus position of a lens to each object) is not used as a variable of the deterioration function. In other words, a blurring caused by defocusing is not considered in the deterioration function. As a result, a quasi-optical performance is improved while leaving a depth of field as it is, and therefore the user can easily shoot an image with an intended depth of field. Combining the distance information of the object space with the deterioration function, the blurring caused by defocusing may be corrected and the depth of field may be enlarged in addition to the correction of the aberration and the diffraction. The distance information of the object space may be obtained by shooting a plurality of images while changing the focus position, and alternatively the distance information may be calculated based on a parallax image. The image pickup apparatus 100 may include a ranging unit (a focus detection unit). The parallax image is obtained by arranging a plurality of optical systems to shoot an image, or is obtained by shooting a plurality of images while shifting a shooting position. The ranging unit, for example, has a structure of illuminating infrared light to detect its reflected light.

According to the configuration of the present embodiment, an image pickup apparatus and an image processing method which are capable of restoring a frequency component lost due to aberration or diffraction in a shot image can be provided.

(Embodiment 2)

Figure 9:
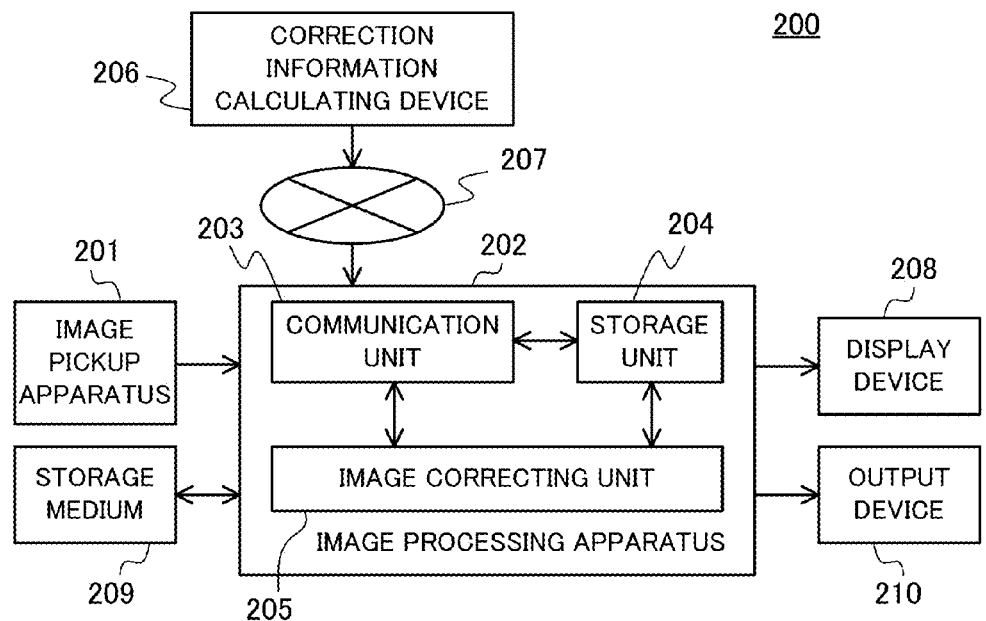
FIG. 9 is a block diagram of an image processing system in Embodiment 2.
Figure 10:
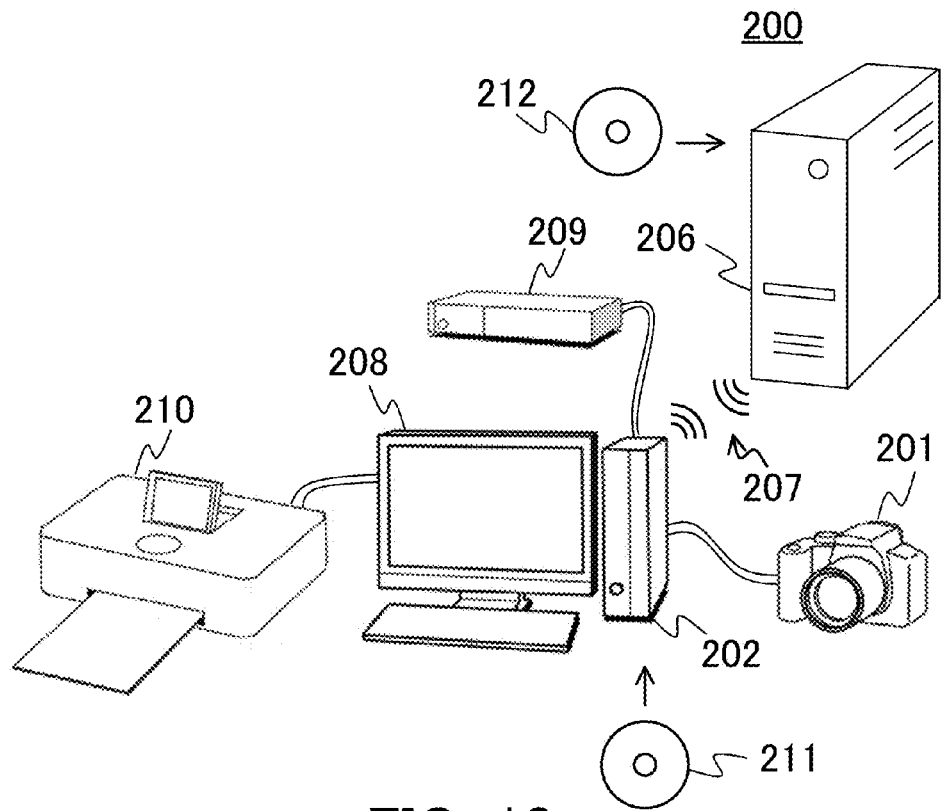
FIG. 10 is an external view of an image processing system in Embodiment 2.

Next, referring to FIGS. 9 and 10, Embodiment 2 of the present invention will be described. The present embodiment applies the image processing method of Embodiment 1 to an image processing system. FIG. 9 is a block diagram of an image processing system 200 in the present embodiment. FIG. 10 is an external view of the image processing system 200.

In FIGS. 9 and 10, an image processing apparatus 202 and a correction information calculating device 206 are a computer device which performs the image processing method of the present embodiment. The image processing apparatus 202 includes a communication unit 203. The communication unit 203 receives the first image (the shot image) from an image pickup apparatus 201. The communication unit 203 is connected to the correction information calculating device 206 via a network 207. This connection may be any of wired or wireless connection.

The correction information calculated in the correction information calculating device 206 is stored in a storage unit 204 of the image processing apparatus 202. The image correcting unit 205 performs correction processing by using shooting condition information for the first image obtained by the image pickup apparatus 201. The second image obtained by correcting the first image in the image correcting unit 205 is outputted to one or more of a display device 208, a storage medium 209, and an output device 210. The display device 208 is for example a liquid crystal display or a projector. The user can work while confirming an image in the middle of the image processing via the display device 208. The storage medium 209 is for example a semiconductor memory, a hard disk, or a server on the network. The output device 210 is a printer or the like. The image processing apparatus 202 has a function of performing a development processing or other image processing as needed.

In order to realize the image processing method of the present embodiment, software (an image processing program) can also be supplied to the image processing apparatus 202 and the correction information calculating device 206 (an information processing apparatus) via a network or a storage medium (storage media 211 and 212) such as a CD-ROM. In this case, a computer (or CPU, MPU, etc.) of the information processing apparatus reads out the image processing program to execute functions of the image correcting unit 205 and the correction information calculating device 206.

The flowcharts of the image processing method (the method of calculating the correction information and the method of correcting the image) performed by the correction information calculating device 206 and the image correcting unit 205 in the present embodiment are as illustrated in FIGS. 4 and 8, respectively. Hereinafter, descriptions similar to those of Embodiment 1 are omitted.

In Step S102 of FIG. 4, the correction information calculating device 206 obtains the deterioration function. The correction information calculating device 206 of the present embodiment can be connected to various types of image pickup apparatuses. Therefore, when the deterioration function is a function based on the optical system (the image pickup optical system) of the image pickup apparatus 201, the type of the connected image pickup apparatus 201 is also a variable of determining the deterioration function. In the present embodiment, the plurality of pieces of correction information calculated by the correction information calculating device 206 in Step S111 of FIG. 4 are sent to the image processing apparatus 202 (the communication unit 203) via the wireless or wired network 207.

In Step S204 of FIG. 8, the image correcting unit 205 of the image processing apparatus 202 obtains information of the deterioration function corresponding to the target pixel. In this time, the image correcting unit 205 uses the shooting condition information of the first image (the shot image). The shooting condition information contains a type of the image pickup apparatus 201 (the image pickup optical system), an aperture stop, a focus position, or a focal length at the time of shooting an image, and the like. In the present embodiment, at least one of them only needs to be contained as the shooting condition information. The shooting condition information is stored in the same file as that of the first image. The image processing apparatus 202 (the image correcting unit 205) may be configured to read the shooting condition information from the image pickup apparatus 201.

According to the present embodiment, an image processing system capable of restoring a frequency component lost due to aberration or diffraction in a shot image can be provided.

(Embodiment 3)

Figure 11:
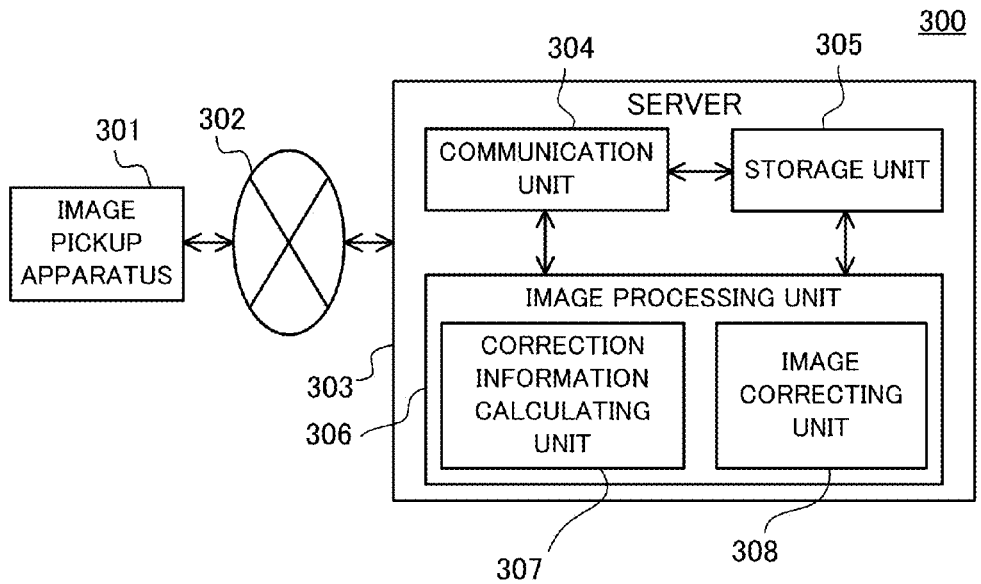
FIG. 11 is a block diagram of an image pickup system in Embodiment 3.
Figure 12:
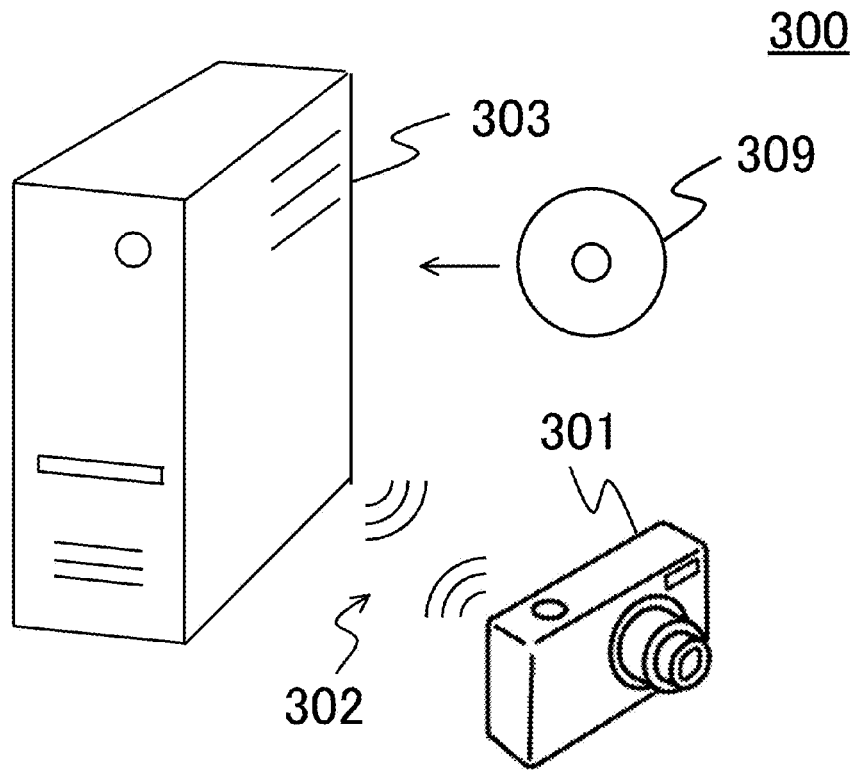
FIG. 12 is an external view of the image pickup system in Embodiment 3.

Next, referring to FIGS. 11 and 12, Embodiment 3 of the present invention will be described. The present embodiment applies the image processing method of Embodiment 1 to an image pickup system. FIG. 11 is a block diagram of an image pickup system 300 in the present embodiment. FIG. 12 is an external view of the image pickup system 300.

In FIGS. 11 and 12, a server 303 includes a communication unit 304, which is connected to an image pickup apparatus 301 via a network 302. This connection may be a wired or wireless connection. The connection unit 304 is configured to receive a first image (a shot image) from the image pickup apparatus 301. When the image pickup apparatus 301 shoots an image, the first image (the shot image) is automatically or manually inputted to the server 303, and then is sent to a storage unit 305 and an image processing unit 306. The storage unit 305 stores the first image and shooting condition information (information related to a shooting condition when the first image is shot).

A correction information calculating unit 307 and an image correcting unit 308 of the image processing unit 306 perform an image processing method of the present embodiment. The correction information calculating unit 307 previously calculates correction information. The storage unit 305 stores the correction information (a calculation result) which is calculated by the correction information calculating unit 307. The image correcting unit 308 generates a second image in which an influence of aberration or diffraction is reduced by using the correction information and the first image (the shot image). The second image generated by the image correcting unit 308 is outputted to the image pickup apparatus 301 or is stored in the storage unit 305.

In order to realize the image processing method of the present embodiment, software (an image processing program) can also be supplied to the server 303 (an information processing apparatus) via a network or a storage medium (a storage medium 309) such as a CD-ROM. In this case, a computer (or CPU, MPU, etc.) of the information processing apparatus reads out the image processing program to execute a function of the server 303.

The flowcharts of the image processing method (the method of calculating the correction information and the method of correcting the image) performed by the correction information calculating unit 307 and the image correcting unit 308 in the present embodiment are as illustrated in FIGS. 4 and 8, respectively. The methods of calculating the correction information and of correcting the image are similar to those of Embodiments 1 and 2, and therefore descriptions of them are omitted. In the present embodiment, the first image (the shot image) obtained by the image pickup apparatus 301 is sent to the server 303 (the communication unit 304) via the wireless or wired network 302.

According to the configuration of the present embodiment, an image pickup system capable of restoring a frequency component lost due to aberration or diffraction in a shot image can be provided.

(Other Embodiments)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image pickup apparatus, an image processing system, an image pickup system, an image processing method, and a storage medium which are capable of restoring a frequency component lost due to aberration or diffraction in a shot image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-063170, filed on Mar. 26, 2013, which is hereby incorporated by reference herein in its entirety.

What is claimed is:

1. An image processing apparatus configured to generate, from a first image obtained via an image pickup optical system, a second image in which a frequency component decreased due to aberration or diffraction of the image pickup optical system is restored, the image processing apparatus comprising a processor configured to execute computer executable instructions;

a storage device storing computer executable instructions, including instructions, that when executed, cause the image processing apparatus to:

apply a plurality of deterioration functions to a reference image to generate a plurality of deteriorated images;
generate a plurality of groups each including similar partial regions based on the deterioration functions and information distributions in partial regions of the deteriorated images;
calculate correction information, for each of the groups, based on the reference image and the deteriorated images;
read, from the correction information of the plurality of groups, correction information of a group corresponding to a partial region based on an information distribution in the partial region of the first image and a deterioration function related to the aberration or the diffraction of the image pickup optical system corresponding to the partial region; and
generate corrected pixels constituting the second image based on the partial region of the first image and the read correction information,
wherein the deterioration functions applied to the reference image are deterioration functions based on the aberration or the diffraction of the image pickup optical system.

2. The image processing apparatus according to claim 1, wherein the correction information is a coefficient to minimize an error when a pixel signal value of the reference image is represented by a linear combination of a plurality of pixel signal values of the deteriorated image.

3. The image processing apparatus according to claim 1, wherein the partial region of the first image is determined depending on a size and a shape of the deterioration function based on the aberration or the diffraction of the image pickup optical system.

4. The image processing apparatus according to claim 1, wherein the deterioration function contains a distortion component, and the image processing apparatus is configured to perform an electronic distortion correction for the deteriorated image and then extract the partial region.

5. An image pickup apparatus configured to generate, from a first image obtained via an image pickup optical system, a second image in which a frequency component decreased due to aberration or diffraction of the image pickup optical system is restored, the image pickup apparatus comprising:
an image sensor configured to obtain the first image via the image pickup optical system; and
a processor configured to execute computer executable instructions;
a storage device storing computer executable instructions, including instructions, that when executed, cause the image pickup apparatus to:
apply a plurality of deterioration functions to a reference image to generate a plurality of deteriorated images;
generate a plurality of groups each including similar partial regions based on the deterioration functions and information distributions in partial regions of the deteriorated images;
calculate correction information, for each of the groups, based on the reference image and the deteriorated images;
read, from the correction information of the plurality of groups, correction information of a group corresponding to a partial region based on an information distribution in the partial region of the first image and a deterioration function related to the aberration or the diffraction of the image pickup optical system corresponding to the partial region; and
generate corrected pixels constituting the second image based on the partial region of the first image and the read correction information,
wherein the deterioration functions applied to the reference image are deterioration functions based on the aberration or the diffraction of the image pickup optical system.

6. The image pickup apparatus according to claim 5, wherein the correction information is a coefficient to minimize an error when a pixel signal value of the reference image is represented by a linear combination of a plurality of pixel signal values of the deteriorated image.

7. The image pickup apparatus according to claim 5, wherein the partial region of the first image is determined depending on a size and a shape of the deterioration function based on the aberration or the diffraction of the image pickup optical system.

8. The image pickup apparatus according to claim 5, wherein the deterioration function contains a distortion component, and the image processing apparatus is configured to perform an electronic distortion correction for the deteriorated image and then extract the partial region.

9. An image processing method of generating, from a first image obtained via an image pickup optical system, a second image in which a frequency component decreased due to aberration or diffraction of the image pickup optical system is restored, the image processing method comprising the steps of:
applying a plurality of deterioration functions to a reference image to generate a plurality of deteriorated images;
generating a plurality of groups each including similar partial regions based on the deterioration functions and information distributions in partial regions of the deteriorated images;
calculating correction information, for each of the groups, based on the reference image and the deteriorated images;
reading, from the correction information of the plurality of groups, correction information of a group corresponding to a partial region based on an information distribution in the partial region of the first image and a deterioration function related to the aberration or the diffraction of the image pickup optical system corresponding to the partial region; and
generating corrected pixels constituting the second image based on the partial region of the first image and the read correction information,
wherein the deterioration functions applied to the reference image are deterioration functions based on the aberration or the diffraction of the image pickup optical system.

10. A non-transitory computer-readable storage medium which stores a program to cause a computer to execute a process of generating, from a first image obtained via an image pickup optical system, a second image in which a frequency component decreased due to aberration or diffraction of the image pickup optical system is restored, the process comprising the steps of:
applying a plurality of deterioration functions to a reference image to generate a plurality of deteriorated images;
generating a plurality of groups each including similar partial regions based on the deterioration functions and information distributions in partial regions of the deteriorated images;

calculating correction information, for each of the groups, based on the reference image and the deteriorated images;

reading, from the correction information of the plurality of groups, correction information of a group corresponding to a partial region based on an information distribution in the partial region of the first image and a deterioration function related to the aberration or the diffraction of the image pickup optical system corresponding to the partial region; and generating corrected pixels constituting the second image based on the partial region of the first image and the read correction information, wherein the deterioration functions applied to the reference image are deterioration functions based on the aberration or the diffraction of the image pickup optical system.

* * * * *